US007000499B2

(12) United States Patent
Valle

(10) Patent No.: US 7,000,499 B2
(45) Date of Patent: Feb. 21, 2006

(54) BICYCLE CRANK AND METHOD FOR MANUFACTURING SAID CRANK

(75) Inventor: Maurizio Valle, Vicenza (IT)

(73) Assignee: Campagnolo, S.r.l., Vicenza (IT)

( * ) Notice: Subject to any disclaimer, the term of this patent is extended or adjusted under 35 U.S.C. 154(b) by 61 days.

(21) Appl. No.: 10/174,754

(22) Filed: Jun. 19, 2002

(65) Prior Publication Data
US 2003/0019325 A1 Jan. 30, 2003

(30) Foreign Application Priority Data
Jun. 27, 2001 (IT) .......................... TO2001A0621

(51) Int. Cl.
G05G 1/14 (2006.01)
(52) U.S. Cl. .................................... 74/594.1
(58) Field of Classification Search .............. 74/594.1, 74/594.2, 594.3
See application file for complete search history.

(56) References Cited

U.S. PATENT DOCUMENTS

| 4,171,822 A | * | 10/1979 | Thun | 280/259 |
| 4,811,626 A | | 3/1989 | Bezin | 74/594.1 |
| 4,841,801 A | | 6/1989 | Tice | 74/573 R |
| 5,010,785 A | | 4/1991 | Romero | |
| 5,435,869 A | | 7/1995 | Christensen | 156/175 |
| 5,851,459 A | | 12/1998 | Chen | 264/46.7 |
| 5,941,135 A | * | 8/1999 | Schlanger | 74/594.1 |
| 6,058,803 A | * | 5/2000 | Yamanaka | 74/594.1 |
| 6,079,294 A | * | 6/2000 | Mizobe | 74/594.1 |
| 6,202,506 B1 | | 3/2001 | Storck et al. | 74/594.1 |
| 6,227,070 B1 | * | 5/2001 | Mizobe et al. | 74/594.1 |
| 2003/0019324 A1 | * | 1/2003 | Valle | 74/594.1 |

FOREIGN PATENT DOCUMENTS

| EP | 0270388 A1 | 6/1988 |
| EP | 0850826 A2 | 7/1998 |
| EP | 19755950 A1 | 6/1999 |
| FR | 2636386 | 3/1990 |
| JP | 06321167 | 11/1994 |
| TW | 390330 | 5/2000 |
| TW | 448114 | 8/2001 |
| WO | WO9857840 A | 12/1998 |

OTHER PUBLICATIONS

E. Heitz, Faserverstarkte Verbundwerkstoffe im Freizeitgerat, Aug. 1996, pp. 646-651, no translation.

* cited by examiner

Primary Examiner—Vicky A. Johnson
(74) Attorney, Agent, or Firm—Volpe and Koenig, P.C.

(57) ABSTRACT

Bicycle crank comprising an elongated core with a first and a second end, a first and a second insert arranged on the ends of the core, and a high-resistance fiber coating incorporated in a plastic material matrix forming a casing incorporating the core and the inserts is provided. The core is a rigid element and each insert is equipped with a connecting portion inserted into a respective end of the core to establish a shape coupling therewith.

14 Claims, 3 Drawing Sheets

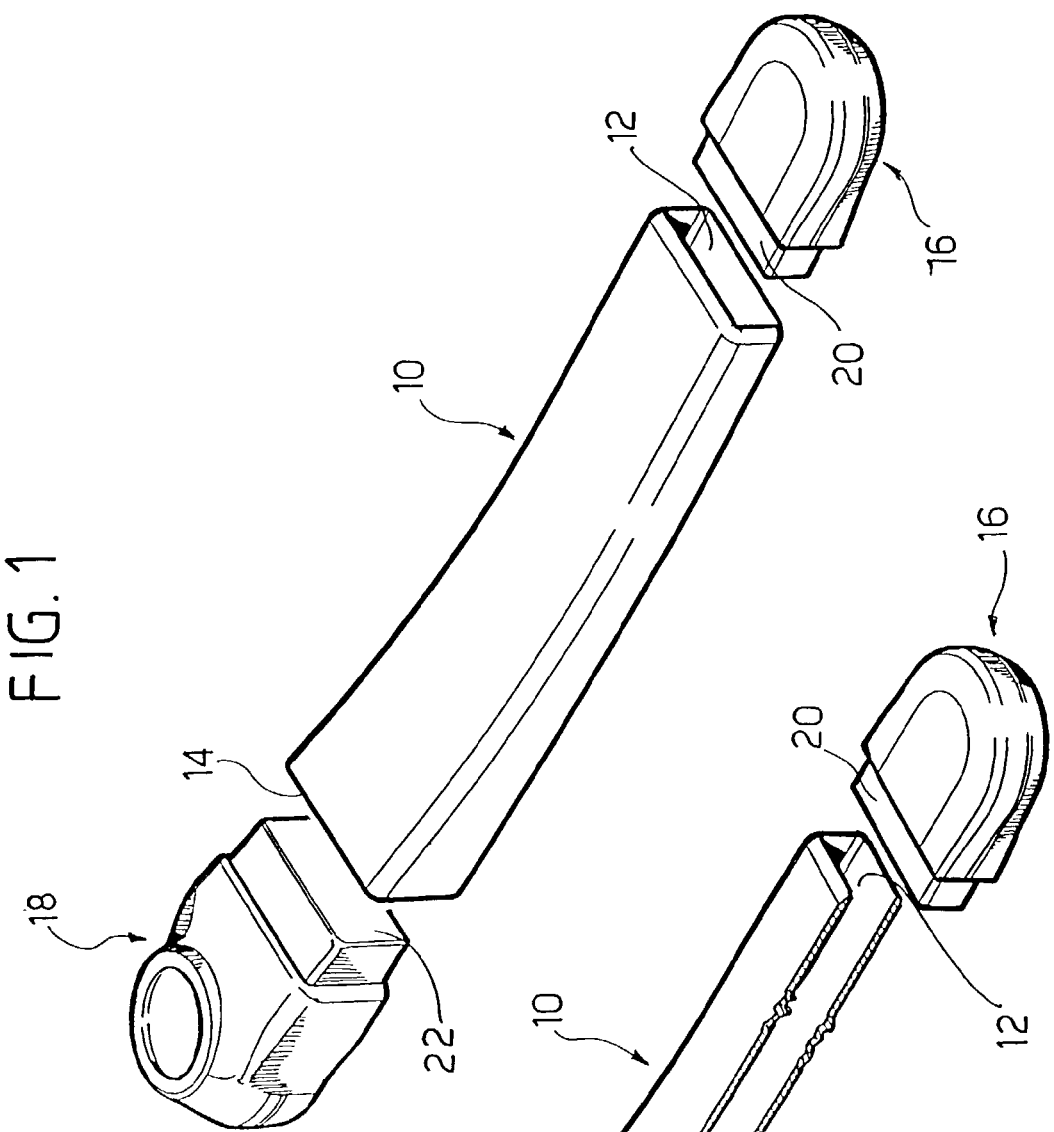

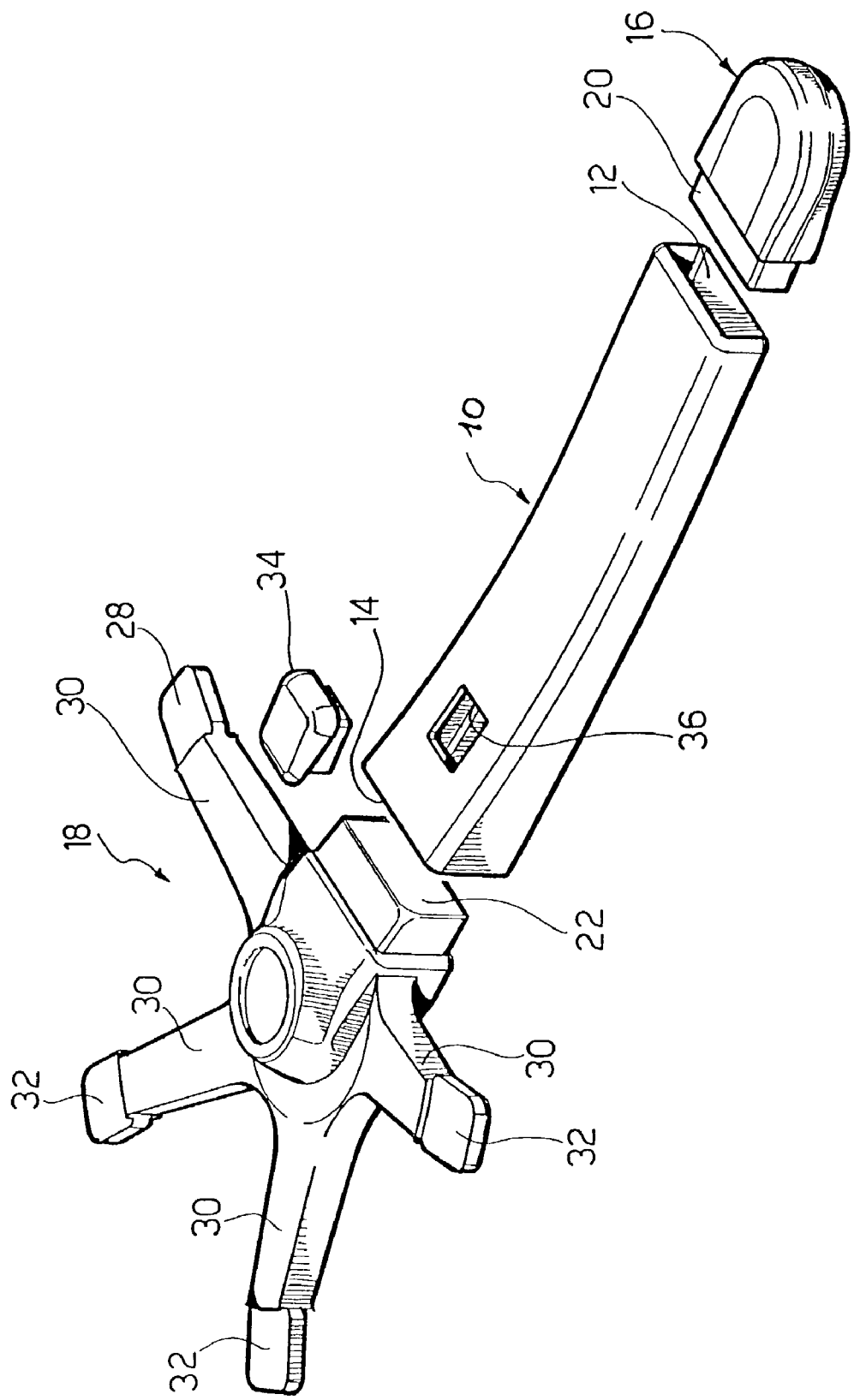

BICYCLE CRANK AND METHOD FOR MANUFACTURING SAID CRANK

BACKGROUND

Figure 6:
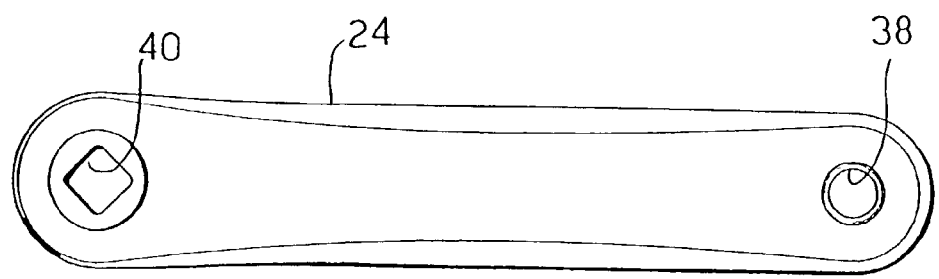

This invention relates to a bicycle crank and a method for manufacturing said crank.

More precisely, this invention relates to a bicycle crank comprising:

an elongated core with a first and a second end, a first and a second insert arranged on the ends of said core, and a high-resistance fibre coating incorporated in a plastic material matrix.

U.S. Pat. No. 6,202,506 describes a bicycle crank of the type specified above, wherein the inserts are foamed into a rigid plastic material forming the core of the crank. Said U.S. Pat. No. 6,202,506 describes a procedure for manufacturing a crank comprising the following steps: introducing into a mould one layer of fabric soaked in synthetic resin providing a partially open fibre-reinforced plastic casing, inserting a pair of inserts in the partially open casing, foaming the inserts with high-resistance foam, sealing the fibre-reinforced plastic material casing with at least one layer of fibre fabric soaked in plastic material, and hardening the fibre-reinforced plastic material and said foam.

U.S. Pat. No. 4,811,626 describes a bicycle crank formed by three separate elements: a crank arm and two end-pieces. The crank arm consists of an element of composite material formed by overmoulding of a synthetic resin on a tubular core of reinforced fibres such as carbon fibres or aramid fibres. The two end-pieces have respective connecting elements which are forcibly engaged within the corresponding end of the tubular element which forms the crank arm. The crank described in this document is not provided with a high-resistance casing and the end-pieces and the crank arm may consequently come apart.

SUMMARY

The object of the present invention is to provide a light, resistant crank and a method for making said crank, which does not require foaming the inserts in the mould.

According to the present invention, this object is attained by means of a crank and a manufacturing method which characteristics are described in the claims.

BRIEF DESCRIPTION OF THE DRAWING(S)

Figure 4:
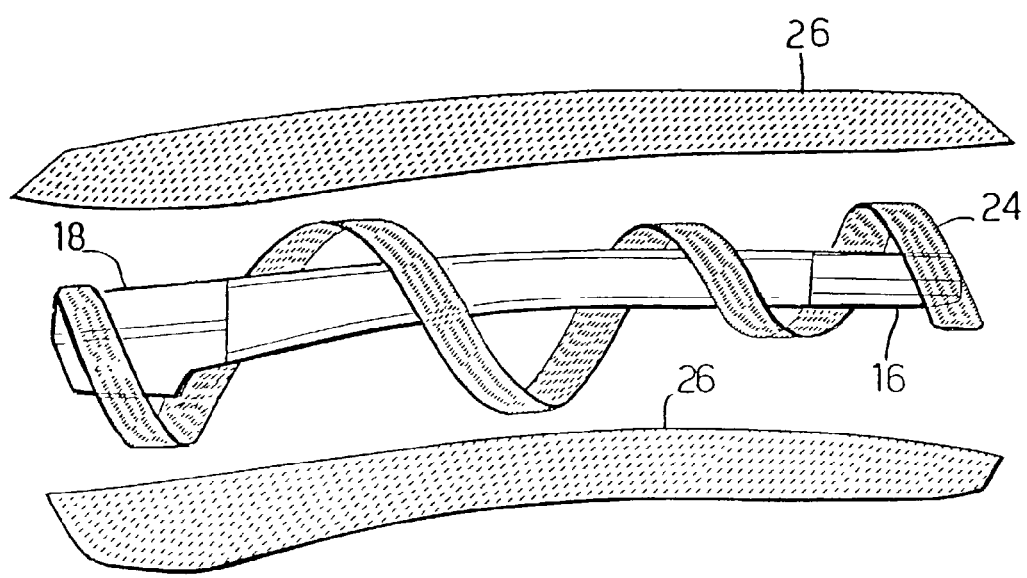
Figure 5:
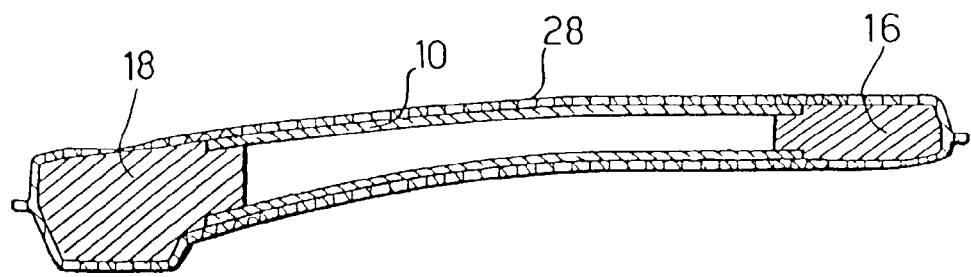

This invention will be better explained by the following detailed descriptions with reference to the accompanying figures as non-limiting example, wherein:

FIG. 1 is a perspective exploded view illustrating the components of a left crank according to this invention, FIG. 2 is a perspective view similar to FIG. 1 illustrating a longitudinal cross-section of the core, FIG. 3 is a perspective exploded view illustrating the components of a right crank according to this invention, FIG. 4 schematically illustrates the lamination phase employing layers of carbon fibre for manufacturing a crank according to this invention, FIG. 5 is a longitudinal cross-section view of a crank according to this invention at the end of the lamination and carbon fibre polymerisation phase, and FIG. 6 is a top view of a finished crank.

DETAILED DESCRIPTION OF THE PREFERRED EMBODIMENT(S)

With reference to FIGS. 1 and 2, numeral 10 indicates a tubular core made of rigid material, for example injection moulded plastic material, metallic material (aluminium alloy or similar material) or highresistance fibre reinforced plastic material, such as carbon fibres or similar. Core 10 has an elongated shape and presents two ends 12, 14, to which respective inserts 16, 18 are connected, said inserts being provided with connecting portions 20, 22 which are inserted into respective end portions 12, 14 to establish a shape coupling with the core 10. The inserts 16, 18 can be made of metallic material, for example aluminium alloy, or fibre-reinforced plastic material. The inserts present holes for housing the pedal spindle and the bottom bracket spindle, respectively (not shown).

As schematically illustrated in FIG. 4, the arrangement comprising the core 10 and the inserts 16, 18 is wrapped in tapes 24 and sheets 26 formed by structural high-resistance fibres incorporated in a plastic material matrix. Preferably, the tapes and the sheets 24, 26 are made of carbon fibre fabric incorporated in a thermosetting resin. The structural fibres can be selected among carbon fibres, glass fibres, aramidic fibres, boron fibres, ceramic fibres or any combinations thereof.

The core 10 holds the inserts 16, 18 joined in a predefined position and forms a supporting surface during lamination. The term "lamination" herein refers to the layering operations of the tapes 24 and the sheets 26 on the arrangement formed by the inserts 16, 18 and the core 10. This operation is used to direct the reinforcement fibres in the most suitable fashion to confer the required structural characteristics to the crank. After lamination, the crank is subjected to moulding and simultaneous heating at a temperature either equal to or higher than the polymerisation temperature of the thermosetting resin. The moulding operation is carried out in a mould and press (not shown). During moulding, the applied pressure is contrasted by the core and the inserts. During moulding, the core 10 provides a suitable contrast to the moulding pressure. This pressure compacts the plastic material matrix fabric. The presence of a rigid material core 10 implies that a high moulding pressure can be applied, to the advantage of compacting the layers of fibre in the plastic material matrix.

After moulding, the plastic material matrix is hardened. The crank removed from the mould appears as shown schematically in FIG. 5, with a homogenous carbon fibre casing 28 enclosing the core 10 and the inserts 16, 18. The casing 28 has high-resistance structural characteristics and is capable of transferring the stress to which the crank is subjected during use from one insert to the other.

The procedure described above with reference to the left crank is used similarly for manufacturing the right crank, as shown in FIG. 3. In this case, the insert 18 for connecting the bottom bracket is equipped with a set of integral metallic spokes 30. In the form of embodiment shown in FIG. 3, the insert 18 has four spokes 30, which ends 32 form points for fastening a pair of chain wheels (not shown). A fifth fastening point is obtained by means of a third metallic insert 34 housed in a recess 36 formed in the core 10. The crank shown in FIG. 3 is subjected to lamination and polymerisation in the mould similarly as described above.

Both in the case of the left crank and in the case of the right crank, the inserts are subjected to mechanical machining to form a threaded hole 38 for connecting a pedal spindle and a square hole 40 for connecting a bottom bracket spindle after polymerisation in mould.

The solution according to this invention attains the objective of providing a crank which weight is lighter than traditional cranks while providing the same rigidity. The system according to this invention can be used to very easily vary the shape and the dimensions of the crank, by replacing the tubular core and intervening on the moulds, to vary the length of the crank and the so-called Q-Factor (i.e., the distance between the external surface of the crank and the median plane of the frame), for example, for double and triple chain wheel versions.

As already said, the main purpose of the elongated rigid core 10 is that of providing a form and a supporting surface to the structural fibres. The core 10, therefore, does not present, substantially, any structural resistance, or presents a limited structural resistance. With the term limited structural resistance it is intended that the great part of the structural resistance to the crank is given by the casing 28, which presents a high-resistance and is capable of transferring the great part of the force and of the torque between the inserts 16 and 18 during the use of the crank.

Naturally, numerous changes can be implemented to the construction and forms of embodiment of the invention herein envisaged, all comprised within the context of the concept characterising this invention, as defined by the following claims.

What is claimed is:

1. Method of manufacturing a bicycle crank, characterised by comprising the following steps:
   a) forming an elongated rigid core;
   b) matingly engaging a pair of inserts to the opposite ends of said elongated core;
   c) helically wrapping structural fibres incorporated in tapes of plastic material matrix around the elongated core and the inserts to enclose them;
   d) applying a lamination of structural fibres in a plastic material matrix onto the product of step c); and
   e) hardening said plastic material matrix of steps c) and d) into a high resistance rigid enclosure.

2. Method according to claim 1, characterised in that it comprises the step of applying a third removable insert in an intermediate area of said elongated core.

3. A bicycle crank, comprising:
   an elongated core having first and second open ends;
   first and second inserts, each arranged at one of the ends of said core, and,
   a tape of structural fibres in a plastic material matrix helically wound around the core and the first and second inserts and a lamination of structural fibres incorporated in a plastic material matrix forming a single structural unit.

4. The bicycle crank of claim 3, further comprising a third insert arranged in an intermediate area of said crank.

5. The bicycle crank of claim 3, wherein said structural fibres are chosen from a group comprising: carbon fibres, glass fibres, aramidic fibres, boron fibres, ceramic fibres or a combination thereof.

6. The bicycle crank of claim 3, wherein said inserts are metallic.

7. The bicycle crank of claim 6, wherein said inserts are made of an aluminium alloy.

8. The bicycle crank of claim 6, wherein said inserts are made of fibre-reinforced plastic material.

9. The bicycle crank of claim 3, wherein said elongated core is rigid.

10. The bicycle crank of claim 9, wherein said elongated core is made of plastic.

11. The bicycle crank of claim 9, wherein said elongated core is made of metal.

12. The bicycle crank of claim 9, wherein said elongated core is made of fibre-reinforced plastic material.

13. The bicycle crank of claim 3, wherein said elongated core presents, substantially, no structural resistance or a limited structural resistance.

14. The bicycle crank of claim 3, wherein said elongated core presents end portions in which said inserts are connected to establish a shape coupling.

* * * * *